Sept. 17, 1940.  E. M. PETERSON  2,215,274

FOOD RECEPTACLE

Filed Dec. 9, 1938

Inventor
Ezra M. Peterson,
By Church & Church
His Attorneys

Patented Sept. 17, 1940

2,215,274

UNITED STATES PATENT OFFICE 2,215,274

FOOD RECEPTACLE

Ezra M. Peterson, Ogden, Utah

Application December 9, 1938, Serial No. 244,834

3 Claims. (Cl. 62—10)

This invention relates to food receptacles.

It is a matter of general knowledge that when certain food products having a liquid content, for instance, a product such as butter, are placed in the interior of the ordinary household refrigerator, they become too hard for ready serving, due to the fact that the normal temperature of the main compartment of the refrigerator is so low as to freeze or congeal at least a portion of the liquid content of the product. It has heretofore been proposed to provide an auxiliary compartment in refrigerators for foods such as butter, but such an arrangement is not entirely satisfactory due to the fact that, where the butter has been exposed to atmospheric conditions, for instance, during meal-time, it becomes unduly soft and requires either refrigeration at a lower temperature than prevails in the auxiliary compartment, or refrigeration in that compartment for an unduly long time before it resumes its normal consistency or firmness.

One object of the invention is to provide a portable, protective receptacle or container for food products which will protect the food in the sense that it will tend to hold the food at a given temperature regardless of whether the temperature of the atmosphere is above or below said temperature.

Another object of the invention is to provide a protable, protective receptacle or container for food products, especially food products such as butter, which will maintain the butter at normal firmness over a comparatively long period of time, regardless of whether it is in or out of the refrigerator.

Another object is to provide a protective receptacle for food products having a liquid content, the receptacle being capable of protecting the product enclosed therein in the sense that freezing or congealing of the liquid content of the food product, and thereby the undue hardening of the food product, will be materially retarded.

A still further object is to provide a protective receptacle which is protable and in whose base portion the food product can be subjected to normal atmospheric conditions without undue liquefaction of the liquid content of the food by reason of the fact that said base portion will continue to extract or absorb heat units from the food product when so exposed to atmospheric conditions.

With these and other objects in view, the invention consists in certain details of construction and combinations and arrangements of parts, all as will hereinafter be more fully described, and the novel features thereof particularly pointed out in the appended claims.

In the accompanying drawing illustrating the preferred embodiment of the invention—

Figure 1:
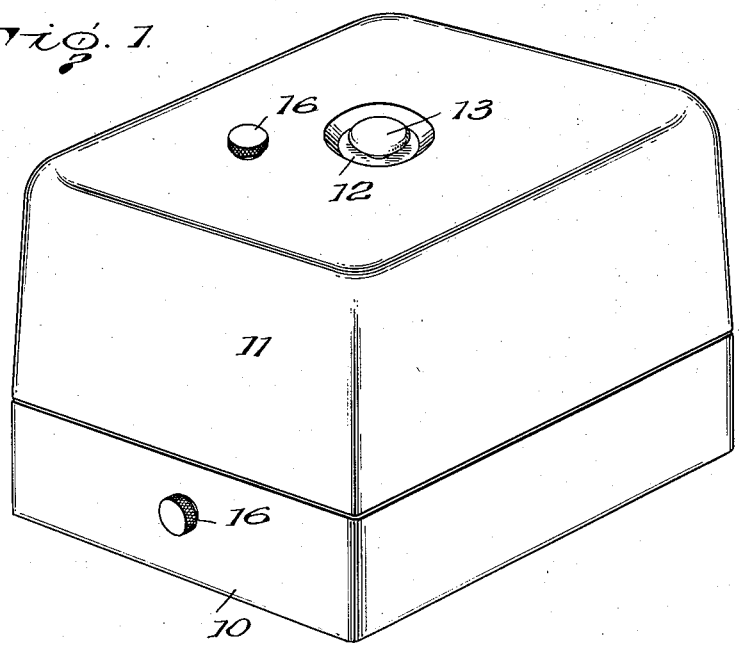
Figure 1 is a perspective view of the receptacle.
Figure 2:
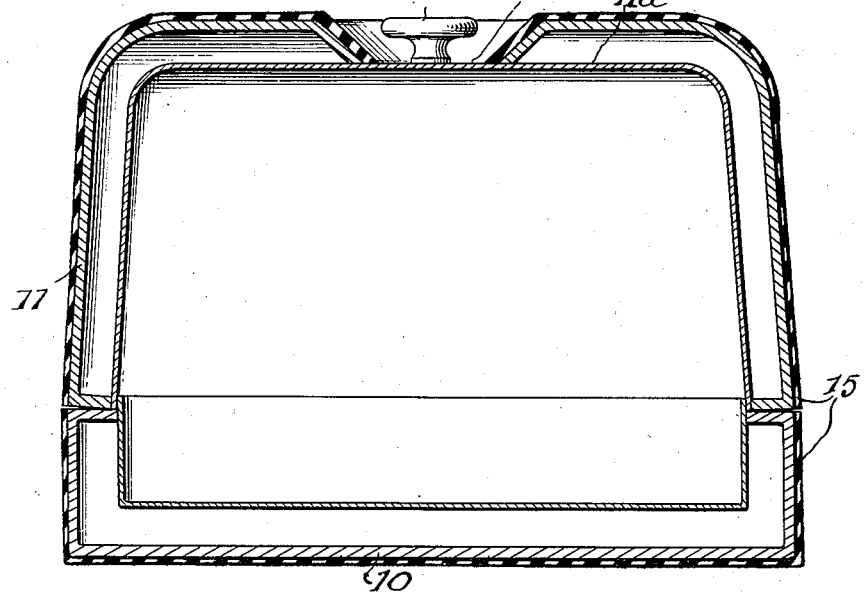
Fig. 2 is a transverse vertical sectional view.

The present receptacle comprises a base portion 10 and a cover 11 for said base portion. Preferably, the base portion is comparatively shallow and may have its exposed surfaces so finished as to adapt it for use as a butter dish or like receptacle on the dining table. On the other hand, the cover is comparatively tall, so that, when assembled on the base 10, a comparatively large unit of butter can be accommodated within the receptacle.

The cover and the base are so constructed as to tend to maintain the butter or other food product in the receptacle at the desired temperature or state of plasticity regardless of the temperature of the atmosphere surrounding the receptacle. Where the surrounding atmosphere is of a temperature below the temperature desired for say butter the exchange of heat units, so to speak, will be retarded after the temperature of the product has reached a given point, so that the rate of extraction of heat units from the food product will gradually decrease after the body of said product has been reduced to a temperature materially in excess above the freezing point of the liquid content of the butter or other food product. For this purpose, the walls of the base and cover are of hollow construction and enclosed within said walls there is a liquid or solution having a freezing point substantially corresponding to the temperature at which it is desired to maintain the food. In the case of products such as butter said solution would have a freezing point in excess of the freezing point of the liquid content of the butter or other food product.

Preferably, the bottom and all the side walls of the base 10 are hollow and filled with said liquid or solution as are also the side walls of the cover, but it is preferred that the top wall of the cover have a disc 12 of thin sheet metal of fairly good conductivity therein to which a handle or knob 13 may be attached. Thus when the receptacle, having butter therein, is placed in the compartment of the ordinary household refrigerator, heat units will be gradually extracted from the butter to a certain, but more or less limited, degree, so that if the butter is too soft when first placed in the refrigerator, it will tend to harden. However, by reason of the fact that the walls of the receptacle are filled with a solution which will congeal at a temperature considerably higher than the freezing point of the liquid content of the butter, said liquid or solution will become frozen long before the liquid content of the butter and, thus, the chilling effect of the colder air in the refrigerator compartment will be consumed, so to speak, in maintaining the liquid or solution of the hollow walls of the receptacle in its frozen state. In other words, the exchange of heat units will take place primarily between the chilled air of the refrigerator compartment and the liquid or solution in the hollow walls of the receptacle, with the result that there will only be what might be termed a secondary exchange of heat units between the food within the receptacle and the chilled air within the refrigerator compartment.

In view of the fact that the base portion of the receptacle is preferably adapted for table use, it is better to use in the hollow walls of the base portion a solution having a freezing point higher than the freezing point of the solution used in the hollow walls of the cover. Preferably, the solution used in the base has a freezing point of approximately 65° F., whereas the solution in the hollow walls of the cover freezes at approximately 60° F. With the solution of higher freezing temperature in the base portion, the frozen solution will have a greater capacity for extracting heat units from the butter, particularly when the latter is exposed on the table and will thus tend to maintain the butter at the desired consistency for a considerable period of time or at least for that length of time normally required for a meal. It will be understood that, when the closed receptacle, with butter therein, is placed in the refrigerator compartment, the solution in the base and cover will freeze so that, when the receptacle is removed at meal time, the solution in the base will be in a frozen state to aid in maintaining the chilled condition of the butter carried therein.

The construction of the base and cover may take various forms but, preferably, they are made with a thin steel or aluminum lining with a covering 15 of Bakelite or hard rubber on their exterior surfaces. The liquid can be introduced into the walls of the cover and base through filling openings provided with screw cap closures 16. A more or less air-tight fit should, of course, be had between the cover and base. Various solutions capable of functioning as above outlined will readily suggest themselves. For instance, a solution consisting of acid acetic glacial Merck, 99% has been used satisfactorily. Another solution that might be used, if desired is caprylic acid. Any solution that will freeze or congeal at the temperature at which food receptacle is to be maintained can be used.

What I claim is:

1. A receptacle for protecting food products having a liquid content while said products are stored in a refrigerating compartment, said receptacle comprising a base portion formed with hollow walls, and a liquid in said walls, said liquid having a higher freezing point than the liquid content of the food to be protected and the freezing point of said liquid also being above the normal temperature within said compartment.

2. A protective receptacle for food products having a liquid content, said receptacle being composed of a base and a cover for said base, said cover having a thin metal top wall and the bottom and side walls of the base and the side walls of the cover being hollow, and a protective liquid in said hollow walls having a freezing point higher than that of the liquid content of the food to be protected.

3. A protective receptacle for storing foods having a liquid content in a refrigerating compartment, said receptacle having a base portion and a covering therefor, the walls of said base portion and cover being hollow, and a protective liquid within said hollow walls, said liquid having a freezing or congealing point substantially corresponding to the temperature at which the protected food is to be maintained but above the normal temperature in said compartment and also above the freezing point of the liquid content of said food.

EZRA M. PETERSON.